US011758272B2

(12) United States Patent
Lin et al.

(10) Patent No.: US 11,758,272 B2
(45) Date of Patent: Sep. 12, 2023

(54) APPARATUS AND METHOD FOR TARGET DETECTION AND LOCALIZATION

(71) Applicant: INTELLIGENT FUSION TECHNOLOGY, INC., Germantown, MD (US)

(72) Inventors: Xingping Lin, Germantown, MD (US); Genshe Chen, Germantown, MD (US); Khanh Pham, Kirtland AFB, NM (US); Erik Blasch, Arlington, VA (US); Zhonghai Wang, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 1 day.

(21) Appl. No.: 16/890,675

(22) Filed: Jun. 2, 2020

(65) Prior Publication Data

US 2021/0377452 A1 Dec. 2, 2021

(51) Int. Cl.
*H04N 23/695* (2023.01)
*G06N 20/00* (2019.01)
*H04N 5/33* (2023.01)
*H04N 23/67* (2023.01)

(52) U.S. Cl.
CPC .......... *H04N 23/695* (2023.01); *G06N 20/00* (2019.01); *H04N 5/33* (2013.01); *H04N 23/675* (2023.01)

(58) Field of Classification Search
CPC ....... H04N 5/23299; H04N 5/33; G06N 20/00
See application file for complete search history.

(56) References Cited

U.S. PATENT DOCUMENTS

| 6,507,366 B1* | 1/2003 | Lee ................. H04N 7/142 348/352 |
| 8,447,179 B2* | 5/2013 | Hamada .......... H04N 5/232123 396/123 |
| 10,302,413 B2* | 5/2019 | Bridges ................ G01S 7/491 |

(Continued)

OTHER PUBLICATIONS

Van Dijk et al. (T. Van Dijk and G. De Croon, "How Do Neural Networks See Depth in Single Images?," 2019 IEEE/CVF International Conference on Computer Vision (ICCV), 2019, pp. 2183-2191, doi: 10.1109/ICCV.2019.00227.) (Year: 2019).*

*Primary Examiner* — Noam Reisner
(74) *Attorney, Agent, or Firm* — ANOVA LAW GROUP, PLLC

(57) ABSTRACT

An apparatus includes a camera for capturing an image at a first moment; a range finder for measuring a distance to an object at a center of the image; a rotatable mounting platform, fixedly hosting the camera and the range finder; and a controller. The controller is configured to receive the captured image and the measured distance; determine whether a target of interest (TOI) appears in the image; in response to determining a TOI appearing in the image, determine whether the TOI appears at the center of the image; calculate position parameters of the rotatable mounting platform for centering the TOI in an image to be captured at a second moment, separated from the first moment by a pre-determined time interval; control the rotatable mounting platform to rotate according to the calculated position parameters; and calculate and store the position parameters of the TOI with respect to the apparatus.

18 Claims, 3 Drawing Sheets

(56) References Cited

U.S. PATENT DOCUMENTS

2007/0291104 A1\* 12/2007 Petersen ............ H04N 5/23296
  348/14.01
2018/0352144 A1\* 12/2018 Miao ........................ G01S 15/66
2021/0133996 A1\* 5/2021 Zhou ..................... B64C 39/024

\* cited by examiner

APPARATUS AND METHOD FOR TARGET DETECTION AND LOCALIZATION

GOVERNMENT RIGHTS

This invention was made with Government support under Contract No. W15QKN-17-C-0038, awarded by the United States Army. The U.S. Government has certain rights in this invention.

FIELD OF THE DISCLOSURE

The disclosure generally relates to the field of electro-optical/infrared (EO/IR) technology, more particularly, relates to an apparatus and a method for target detection and localization.

BACKGROUND

In an open area where the global positioning system (GPS) or other auxiliary positioning tools is available, a target of interest (TOI) can be localized then tracked with the assistance of the positioning tool. However, when conventional positioning tools are not available, localizing and tracking a target may mainly reply on handheld devices. For example, when the duty environment is a close space, such as a tunnel, or an open space where auxiliary positioning tools lost accuracy due to interference, a duty officer may have to use handheld device, including radar, lidar, camera, etc. to localize and track a target.

In many cases, the TOI is movable, and thus localizing the target in real time is important. A radar or a lidar can be used to measure the distance from the equipment to the target, and may also be capable of detecting the direction of the target with respect to the equipment in a three-dimensional space. However, despite of the relatively expensive price, neither the radar nor the lidar are usually designed to be capable of determining whether an object is a TOI. To identify a TOI, a camera, which is relatively inexpensive as compared with a radar or a lidar, is frequently used. However, since the identified target may keep moving, a series of parameters associated with the movement of the target may need to be monitored and even predicted in real time in order to drive the camera to track the identified TOI.

Based on a strategy of combining a camera with a radar/laser range detector/finer, the disclosed apparatus and method for target detection and localization are directed to solve one or more problems set forth above and other problems in the art.

BRIEF SUMMARY OF THE DISCLOSURE

The present disclosure provides an apparatus for target detection and localization. The apparatus includes a camera, configured to capture an image at a first moment; a range finder, configured to measure a distance from an object at a center of the image to the range finder at the first moment; a rotatable mounting platform, configured to fixedly host the camera and the range finder; and a controller. The controller is configured to receive the image captured by the camera and the distance measured by the range finder; determine whether a target of interest (TOI) appears in the image captured by the camera; in response to determining that a TOI appears in the image, determine whether the TOI appears at the center of the image captured by the camera; calculate position parameters of the rotatable mounting platform for centering the TOI in an image to be captured at a second moment, the second moment separated from the first moment by a pre-determined time interval; control the rotatable mounting platform to rotate according to the calculated position parameters of the rotatable mounting platform; and calculate and store, corresponding to the first moment, the position parameters of the TOI with respect to the apparatus.

Another aspect of the present disclosure provides a method for target detection and localization. The method is applied to an apparatus, including a camera; a range finder, a rotatable mounting platform, and a controller. The camera and the range finder are fixed on the rotatable mounting platform. The method includes capturing, by the camera, an image at a first moment; measuring, by the range finder, a distance from an object at a center of the image to the range finder at the first moment; receiving, by the controller, the image captured by the camera and the distance measured by the range finder; determining whether a TOI appears in the image captured by the camera; in response to determining that a TOI appears in the image, determining whether the TOI appears at the center of the image captured by the camera; calculating position parameters of the rotatable mounting platform for centering the TOI in an image to be captured at a second moment, the second moment separated from the first moment by a pre-determined time interval; controlling the rotatable mounting platform to rotate according to the calculated position parameters of the rotatable mounting platform; and calculating and storing, corresponding to the first moment, the position parameters of the TOI with respect to the apparatus.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or similar parts.

The present disclosure provides an apparatus for target detection and localization. The apparatus may include a camera, a range finder, a rotatable mounting platform, and a controller. The camera may be an infrared (IR) camera or any appropriate camera that can capture pictures and/or record videos in the environment where the apparatus operates. The range finder may be a laser-based range finder or a lidar-based range finder. In one embodiment, the range finder may be able to measure the distance from the range finder to an object and may also be able to detect the speed of the object with respect to the range finder. The rotatable mounting platform may include a motor driven by the controller, such that the rotatable mounting platform may rotate in one or more directions. The camera and the range finder may be fixed on the rotatable mounting platform, and thus when the rotatable mounting platform is driven to rotate, the facing direction of the camera and the range finder may be changed. The controller may be configured to process data collected by the range finder and the camera to determine whether a detected object is a target of interest (TOI). In the case that the detected object is a TOI, the controller may also be configured to calculate the position parameters of the rotatable mounting platform in order to keep the apparatus tracking the TOI.

Figure 1:
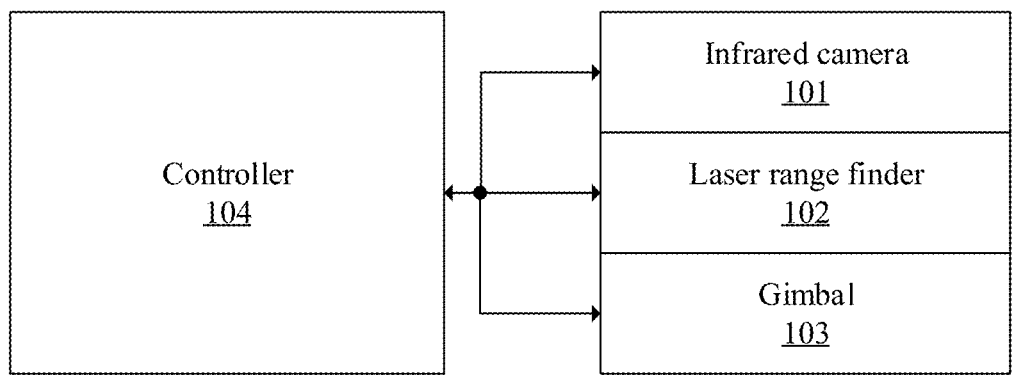
FIG. 1 illustrates a schematic functional diagram of an exemplary apparatus for target detection and localization according to various embodiments of the present disclosure.
Figure 2:
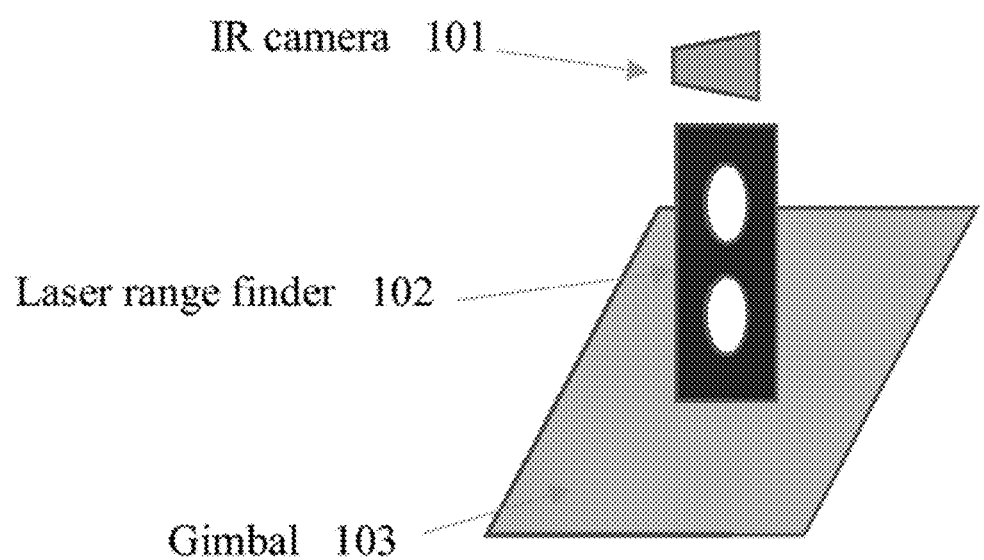
FIG. 2 illustrates a schematic structural diagram of an assembly of certain components of an exemplary apparatus for target detection and localization according to various embodiments of the present disclosure.

FIG. 1 illustrates a schematic functional diagram of an exemplary apparatus for target detection and localization according to various embodiments of the present disclosure, and FIG. 2 illustrates a schematic structural diagram of an assembly of certain components of the apparatus.

Referring to FIGS. 1-2, in one embodiment, the apparatus may include an IR camera 101, a laser range finder 102, a gimbal 103, and a controller 104. In other embodiments, the apparatus may include other types of image/video device, other types of range finder, and/or other types of position-adjustable platform. The apparatus shown in FIGS. 1-2 merely provides an example for illustration. In one embodiment, referring to FIG. 2, the IR camera 101 and the laser range finder 102 may be mounted on the gimbal 103, such that by rotating the gimbal 103, the facing direction of the IR camera 101 and the laser range finder 102 may be changed. In one embodiment, the laser range finder 102 may cover a narrow divergence angle, and the laser beam from the laser range finder 102 may be configured to point to the intended image center of the IR camera 101. As such, by adjusting the position of IR camera, when the TOI appears at the center of the intended image of the IR camera, an accurate measure of the distance between the laser range finder 102 and the TOI may be obtained.

Referring to FIG. 1, the controller 104 may be configured to process the images captured by the IR camera 101 and the data collected by the laser range finder 102. After analyzing an image captured by the IR camera 101, the controller 104 may determine whether the object in the captured image is a TOI. In one embodiment, the data collected by the laser range finder 102 may include a distance from the laser range finder 102 to the TOI, a moving direction and a moving speed of the TOI with respect to the laser range finder 102, etc. The controller 104 may analyze the data collected by the laser range finder 102 to determine the position of the TOI with respect to the apparatus. The position of the TOI with respect to the apparatus may be represented by a series of position parameters defined in a spherical coordinate system centered at the gimbal 103. For example, the position parameters of the TOI may include a distance of the TOI, an azimuth angle of the TOI, and an elevation angle of the TOI. Moreover, the controller 104 may predict the position of the TOI after a pre-determined time interval. Based on the predicted position of the TOI, the controller 104 may further calculate the position parameters for the gimbal in order to keep the IR camera 101 and the laser range finder 102 facing the TOI when capturing the next image after the pre-determined time interval. In one embodiment, the position parameters of the gimbal may include an azimuth angle of the gimbal and an elevation angle of the gimbal. The controller may then control the motor of the gimbal to adjust the position parameters according to the calculated position parameters. In one embodiment, the motor may be driven in fine steps such that the position parameters of the gimbal may be precisely controlled.

In one embodiment, the IR camera may be able to automatically adjust the focus to capture images, the focal parameters may be sent to the controller 104 together with the captured image for further analysis. In a case where a TOI is not at the center of the captured image, the TOI may be blur on the image. However, because the controller 104 is trained to identify different objects, the TOI can still be identified. Further, based on the image, the controller 104 may be able to calculate the position parameters for the gimbal in order to move the TOI to the center of the next image captured after a pre-determined time interval.

In some embodiments, the IR camera 101 may not be able to automatically adjust the focal length, and the controller 104 may be configured to send a focusing parameter to the IR camera 101. The focusing parameter may be calculated based on the distance measured by the laser range finder 102.

In some embodiments, the data collected by the laser range finder 102 may only include a distance from the laser range finder 102 to the TOI, and correspondingly, the controller 104 may take the previous distance collected by the laser range finder 102 (e.g. the distance collected a pre-determined time interval earlier) into account to predict the position of the TOI after a pre-determined time interval. For example, the controller may calculate the distance that the TOI moved and the moving direction of the TOI in the past time period based on the two distances and the position parameters of the gimbal when the two distances were respectively detected.

The pre-determined time interval may not be too long, otherwise the predicted position for the TOI may not be accurate. However, because the rotation of the gimbal is mechanical, which typically takes a certain time, the pre-determined time interval may not be too short, otherwise the gimbal may not be able to complete the position adjustment in the pre-determined time interval. In one embodiment, the pre-determined time interval may be in a range of approximately 0.1 second to 1.0 second. It should be noted that the selection of the pre-determined time interval may highly depend on the actual application scenario. For example, when the TOI moves in a slow speed, the pre-determined time interval may be set long; while when the TOI moves in a fast speed, the pre-determined time interval may be set short. Similarly, when the TOI is far away from the laser range finder 102, the pre-determined time interval may be set long; while when the TOI is close to the laser range finder 102, the pre-determined time interval may be set short.

In one embodiment, prior to using the disclosed apparatus, a machine learning and training process may be performed. For example, a large collection of images may be used to train the controller 104 to identify one or more types of objects, including but not limited to human bodies, dogs, cats, handguns, chairs, desks, computers, etc. During the machine learning and training process, for a certain type of objects, different image sizes, different contrast conditions, and different image definitions may be employed to train the controller 104. After the machine learning and training process, a certain type of objects that the controller 104 has been trained on may be assigned as targets of interest. As such, the controller 104 may be able to promptly identify TOI from the images captured by the IR camera 101.

Figure 3:
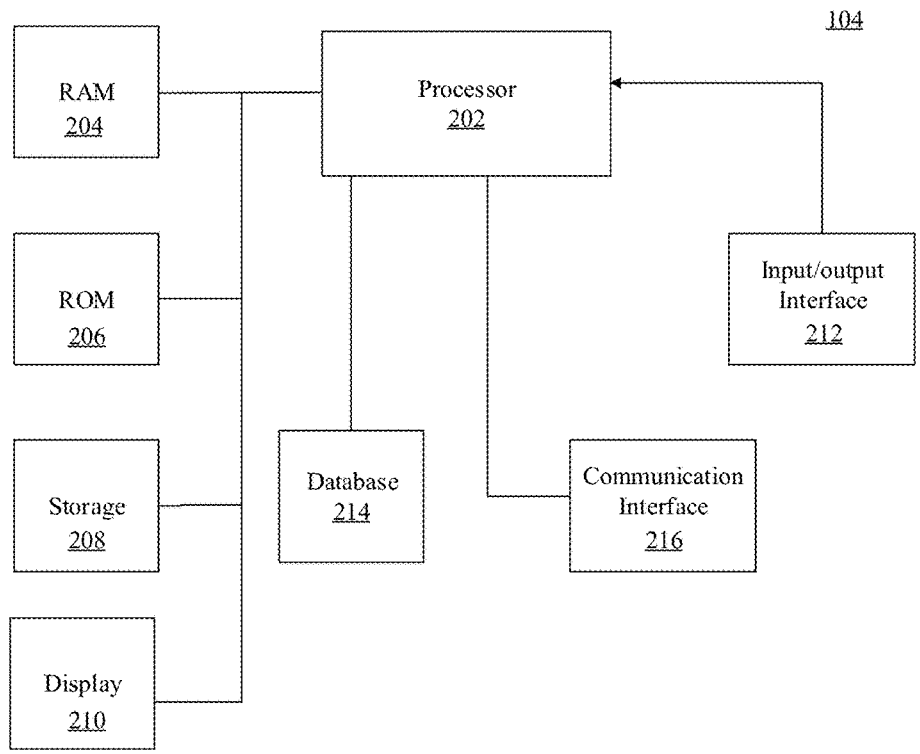
FIG. 3 illustrates a schematic block diagram of a controller in an exemplary apparatus for target detection and localization according to various embodiments of the present disclosure.

FIG. 3 illustrates a schematic block diagram of a controller in an exemplary apparatus for target detection and localization according to various embodiments of the present disclosure. Referring to FIG. 3, in one embodiment, the controller 104 (referring to FIG. 1) may include a processor 202, a random access memory (RAM) 204, a read-only memory (ROM) 206, a storage 208, a display 210, an input/output interface 212, a database 214, and a communication interface 216. In other embodiments, the controller may include other components or certain devices may be removed without departing from the principles of the present disclosure.

In one embodiment, the processor 202 may include any appropriate type of general purpose microprocessor, digital process or microcontroller, and application specific integrated circuit (ASIC). The processor 202 may execute sequences of computer program instructions to perform various processes associated with the controller 104. The computer program instructions may be loaded into RAM 204 and may be executed by the processor 202 from the ROM 206, or from the storage 208. The storage 208 may include any appropriate type of mass storage provided to store any type of information that the processor 202 may need to perform the processes. For example, the storage 208 may include one or more hard disk devices, optical disk devices, flash disks, or other storage devices to provide storage space.

In one embodiment, during the initial machine learning and training process, the processor 202 may category images according to the type of objects and the position information of the object, and may save the images in the database 214 or the storage 208. In addition, images that have been categorized according to the type of objects and the position information of the object may be pre-stored in the ROM 206, such that the processor 202 may directly read the data when determining whether an object is a TOI.

Further, the processor 202 may process the data collected by the laser range finder and predict the position of the TOI after a pre-determined time interval. The images captured by the IR camera and the data collected by the laser range finder together with the predicted position of the TOI may be stored in the storage 208 or the database 214. The processor 202 may determine the position parameters projected for the gimbal at a moment after a pre-determined time interval, and then may control the motor of the gimbal through the input/output interface 212.

The display 210 may provide information to an operator of the disclosed apparatus. The display 210 may include any appropriate type of display device, such as cathode ray tube (CRT) or liquid crystal display (LCD) based devices. The input/output interface 212 may provide the operator the capability to input information into the controller 104, or for the operator to receive information from the controller 104. For example, the input/output interface 212 may include any appropriate input device, such as a keyboard, a mouse, an electronic tablet, a voice communication device, a touch screen, or any other optical or wireless input devices. Further, the input/output interface 212 may receive from and/or send to other external devices. For example, the controller 104 may receive the images captured by the IR camera 101 and the data collected by the laser range finder 102, and may send an electrical signal to control the motor of the gimbal 103 such that the IR camera 101 and the laser range finder 102 may be kept facing the TOI. In one embodiment, when the IR camera 101 faces the TOI, the TOI may appear at the center of the image captured by the IR camera 101.

In one embodiment, the database 214 may include any type of commercial or customized database, and may also include analysis tools for analyzing the information in the data bases. The database 214 may be used for sorting information for semiconductor manufacturing and other related information. The communication interface 216 may provide communication connections such that the controller 104 may be accessed remotely and/or may communicate with other devices through computer networks or other communication networks via various communication protocols, such as transmission control protocol/internet protocol (TCP/IP), hypertext transfer protocol (HTTP), etc. For example, data stored in the storage 208, the database 214, and the ROM 206 may be accessed by other devices through the communication interface 216, and images used in the initial machine learning and training process and other data or information may be transferred from other devices to the controller 104.

Figure 4:
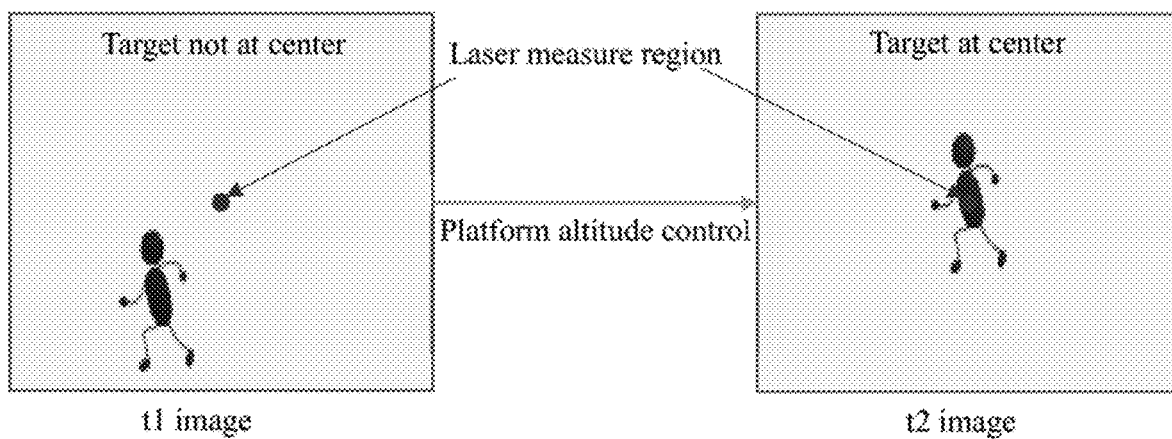
FIG. 4 illustrates a schematic diagram of an application scenario for an exemplary apparatus for target detection and localization according to various embodiments of the present disclosure.

FIG. 4 illustrates a schematic diagram of an application scenario for an exemplary apparatus for target detection and localization according to various embodiments of the present disclosure. Referring to FIG. 4, in one embodiment, a human body may be a TOI. In addition, a narrow laser beam of a laser range finder may be configured to point to the center of the intended image window of an IR camera. That is, once the laser beam of the laser range finder is aligned with the center of the intended image window of the IR camera, the relative position of the laser range finder and the IR camera may be fixed, for example, the IR camera and the laser range finder may both be mounted on a platform.

At time t1, the TOI, e.g. the human body, may not appear at the center of the image captured by the IR camera. Therefore, the laser beam may not be irradiated to the TOI, and thus the distance measured at time t1 may not be accurate. The controller of the disclosed apparatus may calculate the position parameters for the gimbal in order to move the TOI to the center of the next image captured after a pre-determined time interval. In one embodiment, an offset may be determined between the TOI and the center of the image, and the controller may calculate the position parameters of the gimbal based on the offset and the current position parameters of the gimbal. It should be noted that the offset may be a vector, and changing any position parameter of the gimbal (the azimuth angle or the elevation angle) may change the offset of the TOI with respect to the center of the image.

Further, the platform supporting the IR camera and the laser range finder may be adjusted according to the calculated position parameters. At time t2, after adjusting the position parameters of the gimbal, the TOI may appear at the center of the image captured by the IR camera. At this time, the laser beam may be directly irradiated to the TOI, and thus the distance measured at time t2 may be accurate. Further, with all parameters of the gimbal, the IR camera, and the laser range finder, the TOI may be located, e.g. the distance of the TOI, the azimuth angle of the TOI, and the elevation angle of the TOI with respect to the apparatus may be determined.

According to the disclosed apparatus for target detection and localization, a camera and a laser or radar range finder are combined together and mounted on a rotatable mounting platform. A controller is pre-trained through a machine learning and training process and thus is capable of identifying TOI. Images captured by the camera are analyzed by the controller to identify TOI, and the position information of the TOI is collected by the range finder. The controller analyze the position information of the detected TOI and controls the rotatable mounting platform to rotate such that the camera and the range finder are able to keep tracking the TOI. By combining a camera with a range finder, target detection and localization can be achieved in an environment where auxiliary positioning tools are not available. A controller is designed to automatically analyze the data collected by the camera and the range finder, and control the rotatable mounting platform in a real time manner. Therefore, the accuracy of target detection and the precision of position measurement may be ensured. In addition, the camera and the range finder used for the disclosed apparatus are both commercially available in the market, thereby reducing the cost of the product.

Figure 5:
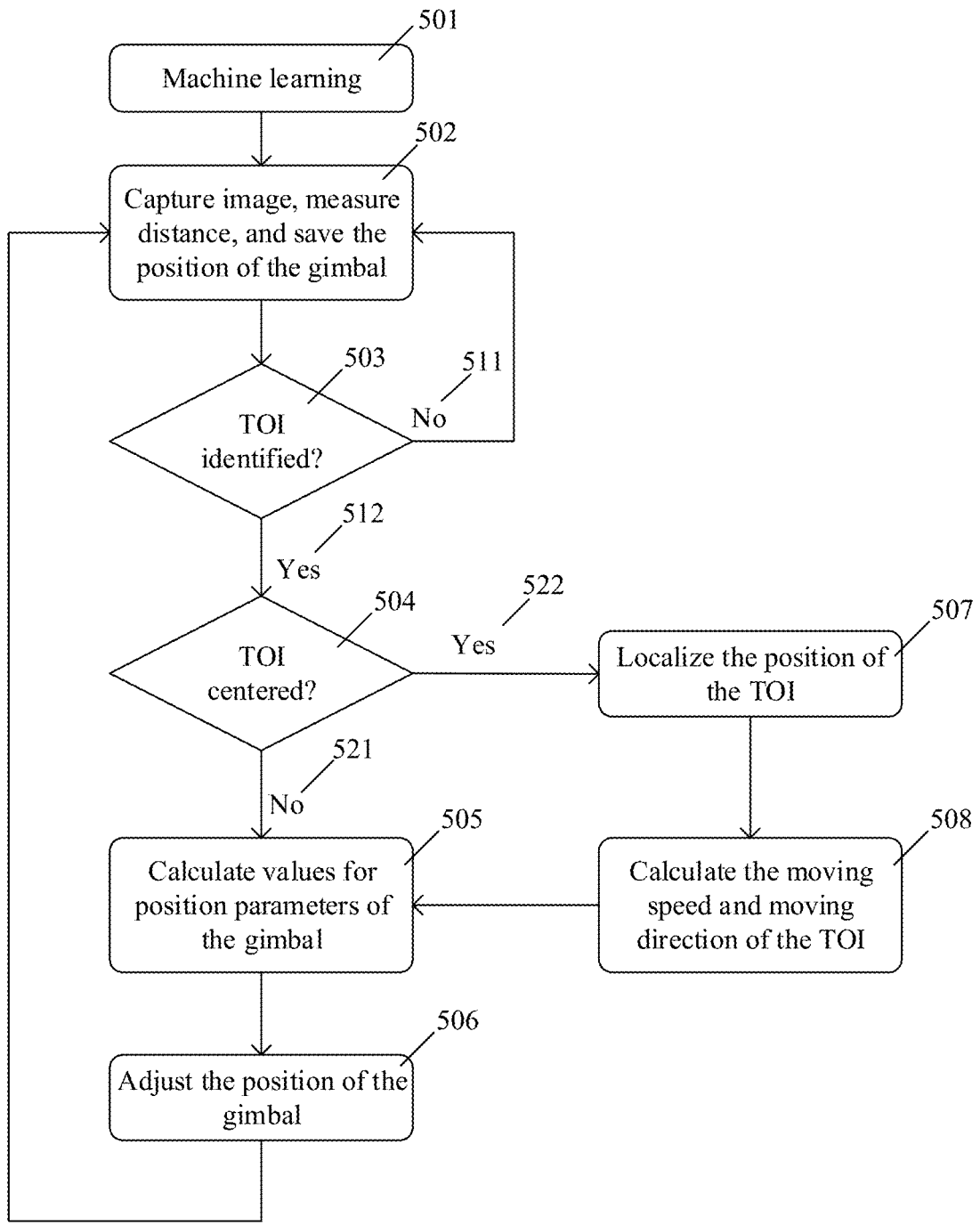
FIG. 5 illustrates a schematic flowchart of an exemplary method for target detection and localization according to various embodiments of the present disclosure.

The present disclosure also provides a method for target detection and localization. The method may be applied to an apparatus. The apparatus may include an IR camera, a laser range finder, a gimbal, and a controller. For the details of the apparatus, reference may be made to the corresponding content in the embodiments provided above. FIG. 5 illustrates a schematic flowchart of an exemplary method for target detection and localization according to various embodiments of the present disclosure.

Referring to FIG. 5, a machine learning process may be performed on the controller (501). A plurality of images, including images of a target of interest (TOI) may be used for training during the machine learning process. In one embodiment, the plurality of images may also include image of object other than the TOI, such that the accuracy of target detection may be improved.

After performing the machine learning and training process, the IR camera may capture an image of a scene, the laser range finder may measure a distance, and the current position parameters of the gimbal may be saved in a local storage medium (502). In one embodiment, when applying the disclosed apparatus to detect and localize a target, the TOI may not be at the center of the captured image, and thus the distance measured by the laser range finder may have a meaningless value. For example, a large value may be read by the laser range finder when no object appears at the center of the image. Such a meaningless distance may not be used for subsequent data processing. However, when the TOI appears at the center of the captured image, the distance may be used to localize the position of the TOI with respect to the apparatus. Moreover, the current position parameters of the gimbal may be saved for further use when localizing an identified TOI with respect to the apparatus.

Further, based on the machine learning experience, the controller may determine whether a TOI appears in the image (503). That is, the image captured by the IR camera may be sent to the controller for TOI identification. When the controller determines that no TOI appears in the image (511), the camera may capture another image after a predetermined time, and the image may again sent to the controller for TOI identification.

However, when the controller determines that a TOI appears in the image (512), the controller may further determine whether the TOI appears at the center of the image captured by the IR camera (504). When the controller determines that the TOI is not at the center of the image (521), the controller may calculate the position parameters for the gimbal in order to center the TOI in an image captured after a pre-determined time interval (505). The controller may calculate the position parameters for the gimbal based on the offset of the TOI from the center of the image and the current position parameters of the gimbal. It should be noted that the moving speed and the moving direction of the TOI are not available at this stage and thus may not be taken into account when calculating the position parameters for the gimbal.

In some embodiments, the controller may determine more than one TOI from a same image, and the controller may select a TOI according to preset priority rules. For example, when each TOI is identified, a distance from the TOI to the IR camera may also be estimated according to the machine learning experience, and corresponding, a priority value of the TOI may be set based on the distance. In other applications, the priority rules may be set based on the image size of the TOI, or any other characteristics of the TOI that can be extracted from the image.

Further, the controller may drive the gimbal to adjust the position according to the calculated position parameters (506). As such, the TOI is expected to appear at the center of the next image captured by the IR camera.

Further, after a predetermined time period, the IR camera may capture another image (502), and the image may be sent to the controller for TOI identification.

When the controller determines that the TOI is at the center of the image (522), the controller may further localize the position of the TOI based on the measured distance and the position of the gimbal (507). To localize the position of the TOI with respect the apparatus, the controller may calculate the position parameters of the TOI based on the position parameters of the gimbal and the distance measured by the laser range finder.

Further, the controller may calculate the moving speed and the moving direction of the TOI (508), and then calculate the position parameters for the gimbal in order to center the TOI in an image captured after a pre-determined time interval (505). The controller may calculate the position parameters for the gimbal based on the moving speed of the TOI, the moving direction of the TOI, and the current position parameters of the gimbal. It should be noted that compared with the calculation in a case where the TOI does not appear at the center of the captured image, the calculation here is based on a scenario where the TOI is located at the center of the captured image, and thus the calculation provides a prediction of the movement of the TOI. By predicting the movement of the TOI, the apparatus for target detection and localization may be able to automatically monitor the movement of a TOI.

Moreover, the characteristic data obtained and/or generated during the target detection and localization process, including the image of the TOI, the determined relative position of the TOI, and the moving speed and moving direction of the TOI may be further used as learned knowledge of the controller, thereby improving the accuracy in future target detection and localization practice.

According to the disclosed method for target detection and localization, a camera and a laser or radar range finder are combined together and mounted on a rotatable mounting platform. A controller is pre-trained through a machine learning and training process and thus is capable of identifying TOI. Images captured by the camera are analyzed by the controller to identify TOI, and the position information of the TOI is collected by the range finder. The controller analyze the position information of the detected TOI and controls the rotatable mounting platform to rotate such that the camera and the range finder are able to keep tracking the TOI. By combining a camera with a range finder, target detection and localization can be achieved in an environment where auxiliary positioning tools are not available. A controller is designed to automatically analyze the data collected by the camera and the range finder, and control the rotatable mounting platform in a real time manner. Therefore, the accuracy of target detection and the precision of position measurement may be ensured. In addition, the camera and the range finder used in the disclosed method are both commercially available in the market, thereby reducing the cost of the product.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. An apparatus for target detection and localization, comprising:
    a camera, configured to capture an image at a first moment;
    a range finder, configured to measure a distance from an object at a center of the image to the range finder at the first moment;
    a rotatable mounting platform, wherein the camera and the range finder are mounted on the rotatable mounting platform; and
    a controller, configured to:
        receive the image captured by the camera and the distance measured by the range finder;
        determine whether at least one target of interest (T01) appears in the image captured by the camera;
        in response to more than one TOI appearing in the image, determine a priority value for each TOI, select a TOI according to the priority values and preset priority rules, and obtain information of the TOI, wherein the priority value of each TOI is a distance from the TOI to the camera, which is estimated according to machine learning experience;
        determine whether the TOI appears at the center of the image captured by the camera;
        in response to determining that the TOI is not at the center of the image:
            calculate first set of position parameters of the rotatable mounting platform for centering the TOI in another image to be captured at a second moment, the second moment separated from the first moment by a pre-determined time interval;
            control the rotatable mounting platform to rotate at a first azimuth angle and a first elevation angle according to the calculated first set of position parameters of the rotatable mounting platform in a spherical coordinate system centered at the rotatable mounting platform, to center the TOI in the another image to be captured at the second moment; and
        while the TOI is captured and centered in the another image, localize the TOI in real time by calculating and storing second set of position parameters of the TOI with respect to the apparatus and corresponding to the first moment,
        wherein characteristic data obtained and/or generated during the target detection and localization, including an image of the TOI, determined relative position of the TOI, and a moving speed and a moving direction of the TOI are used as learned knowledge of the controller to assist estimating the distance from the TOI to the camera.

2. The apparatus according to claim 1, wherein:
    the controller is pre-trained, through a machine learning process using a plurality of images, including images of the TOI, to determine whether the TOI appears in an image.

3. The apparatus according to claim 1, wherein:
    the second set of position parameters of the TOI with respect to the apparatus includes a distance, a second azimuth angle, and a second elevation angle corresponding to the first moment.

4. The apparatus according to claim 1, wherein:
    the pre-determined time interval is in a range of approximately 0.1 second to 1.0 second.

5. The apparatus according to claim 1, wherein:
    when determining that the TOI appears off the center of the image captured by the camera, the controller is further configured to determine an offset of the TOI from the center of the image, and the controller calculates the first set of position parameters of the rotatable mounting platform based on the offset and current first set of position parameters of the rotatable mounting platform.

6. The apparatus according to claim 1, wherein:
    the controller is further configured to calculate a moving speed of the TOI and a moving direction of the TOI, corresponding to the first moment, based on latest two second sets of position parameters of the TOI.

7. The apparatus according to claim 6, wherein:
    when determining that the TOI appears at the center of the image captured by the camera, the controller calculates the first set of position parameters of the rotatable mounting platform based on the moving speed of the TOI, the moving direction of the TOI, and current first set of position parameters of the rotatable mounting platform.

8. The apparatus according to claim 1, wherein:
    the camera is an infrared (IR) camera;
    the range finder is a laser range finder emitting a laser beam pointing to the center of the image window; and
    the rotatable mounting platform is a gimbal.

9. The apparatus according to claim 1, wherein:
    the camera and the range finder mounted on the rotatable mounting platform are both fixed to have a facing direction that changes together as the rotatable mounting platform rotates.

10. The apparatus according to claim 1, wherein:
    the priority rule is set based on an image size of the TOI.

11. A method for target detection and localization, applied to an apparatus including a camera; a range finder, a rotatable mounting platform, and a controller, wherein the camera and the range finder are fixed on the rotatable mounting platform, the method comprising:
    capturing, by the camera, an image at a first moment;
    measuring, by the range finder, a distance from an object at a center of the image to the range finder at the first moment;
    receiving, by the controller, the image captured by the camera and the distance measured by the range finder;
    determining whether at least one target of interest (TOI) appears in the image captured by the camera;
    in response to more than one TOI appearing in the image, determining a priority value for each TOI, selecting a TOI according to the priority values and preset priority rules set based on an image size of the TOI, and obtaining information of the TOI, wherein the priority value of each TOI is a distance from the TOI to the camera, which is estimated according to machine learning experience;

determining whether the TOI appears at the center of the image captured by the camera;

in response to determining that the TOI is not at the center of the image:

calculating first set of position parameters of the rotatable mounting platform for centering the TOI in another image to be captured at a second moment, the second moment separated from the first moment by a pre-determined time interval;

controlling the rotatable mounting platform to rotate at a first azimuth angle and a first elevation angle according to the calculated first set of position parameters of the rotatable mounting platform in a spherical coordinate system centered at the rotatable mounting platform, to center the TOI in the another image to be captured at the second moment; and while the TOI is captured and centered in the another image, localize the TOI in real time by calculating and storing second set of position parameters of the TOI with respect to the apparatus and corresponding to the first moment, wherein characteristic data obtained and/or generated during the target detection and localization, including an image of the TOI, determined relative position of the TOI, and a moving speed and a moving direction of the TOI are used as learned knowledge of the controller to assist estimating the distance from the TOI to the camera.

12. The method according to claim 11, further including:
pre-training the controller, through a machine learning process using a plurality of images, including images of the TOI, to determine whether the TOI appears in an image.

13. The method according to claim 11, wherein:
the second set of position parameters of the TOI with respect to the apparatus include a distance, a second azimuth angle, and a second elevation angle corresponding to the first moment.

14. The method according to claim 11, wherein:
the pre-determined time interval is in a range of approximately 0.1 second to 1.0 second.

15. The method according to claim 11, wherein:
when determining that the TOI appears off the center of the image captured by the camera, the method further includes determining an offset of the TOI from the center of the image, and calculating the first set of position parameters of the rotatable mounting platform for centering the TOI in the another image to be captured at the second moment includes calculating the first set of position parameters of the rotatable mounting platform based on the offset and current first set of position parameters of the rotatable mounting platform.

16. The method according to claim 11, further including:
calculating a moving speed of the TOI and a moving direction of the TOI, corresponding to the first moment, based on latest two second sets of position parameters of the TOI.

17. The method according to claim 16, wherein:
when determining that the TOI appears at the center of the image captured by the camera, calculating the first set of position parameters of the rotatable mounting platform for centering the TOI in the another image to be captured at the second moment includes calculating the first set of position parameters of the rotatable mounting platform based on the moving speed of the TOI, the moving direction of the TOI, and current first set of position parameters of the rotatable mounting platform.

18. The method according to claim 11, wherein:
the camera is an IR camera;
the range finder is a laser range finder emitting a laser beam pointing to the center of the image window; and
the rotatable mounting platform is a gimbal.

* * * * *